United States Patent
Borchers

(10) Patent No.: US 6,763,356 B2
(45) Date of Patent: Jul. 13, 2004

(54) SYSTEM AND METHOD FOR SEARCHING DISPARATE FILE SYSTEMS

(75) Inventor: Fred C. Borchers, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 09/769,975

(22) Filed: Jan. 24, 2001

(65) Prior Publication Data

US 2002/0147704 A1 Oct. 10, 2002

(51) Int. Cl.[7] .............................................. G06F 17/30
(52) U.S. Cl. ............................. 707/10; 707/3; 707/100; 707/101
(58) Field of Search ....................... 707/1–10, 100–102; 709/200–204

(56) References Cited

U.S. PATENT DOCUMENTS

| | | | |
|---|---|---|---|
| 5,001,628 A | * | 3/1991 | Johnson et al. ............... 707/10 |
| 5,724,559 A | | 3/1998 | Masemore |
| 5,737,592 A | * | 4/1998 | Nguyen et al. ................ 707/4 |
| 5,974,443 A | | 10/1999 | Jeske |
| 6,064,977 A | * | 5/2000 | Haverstock et al. .......... 705/9 |
| 6,085,186 A | * | 7/2000 | Christianson et al. ......... 707/3 |

OTHER PUBLICATIONS

"The Milton Keynes clinical intranet," British Journal of Healthcare Computing & Information, vol. 16, No. 5, p. 42.

* cited by examiner

Primary Examiner—Jean M. Corrielus
Assistant Examiner—Joon Hwan Hwang
(74) Attorney, Agent, or Firm—Hoffman, Warnick & D'Alessandro LLC; Michael Hoffman

(57) ABSTRACT

A system and method for searching for data in disparate file systems and returning a merged list of search results. The system includes an interface for receiving a search request; a mechanism for issuing the search request in a first request format to a first search system and for receiving a first list of search results in a first format; a mechanism for issuing the search request in a second request format to a second search system, and for receiving a second list of search results in a second format, wherein the first list is received in a disparate format than the second list; and a mechanism for merging the first list and the second list into a common format.

20 Claims, 3 Drawing Sheets

SYSTEM AND METHOD FOR SEARCHING DISPARATE FILE SYSTEMS

BACKGROUND OF THE INVENTION

1. Technical Field

The present invention relates generally to data searching systems, and relates more particularly to a system and method for searching data in disparate file systems.

2. Related Art

The ability to efficiently share information on a worldwide scale has become increasingly important as businesses and organizations become more globalized. For instance, there often exists a need for workers at different geographic locations within a business to share data files with each other. Examples of such files may include technical support information, development schedules, work projects, guidelines and procedures, plans, white papers, etc. A typical file sharing system comprises a client-server architecture that allows users with client software to access centralized or distributed server systems that store files. Numerous client-server architectures can be used to implement a file sharing system, e.g., the internet, intranets, local area networks (LANs), wide area networks (WANs), virtual private networks (VPN's), etc. With the proliferation of the world wide web, a preferred client interface in such client-server environments has become the web browser. Web browsers provide an easy-to-use interface for users seeking to locate and view data.

Web browsers operate by issuing HTTP (hypertext transfer protocol) commands, and then receiving and displaying HTML (hypertext mark-up language) files. However, not all data is stored in an HTML file format. For example, Lotus Notes™ data is stored in a Lotus Notes file format. Other non-HTML format data can be found on servers running traditional operating systems, such as an IBM server running the VM™ (virtual machine) operating system. In order to access such data, a special interface must be provided that modifies or "wraps" the desired information with the appropriate HTML commands so that the information can be interpreted by the browser. In the case of Lotus Notes data, a Lotus Domino™ Web interface can be used to retrieve and wrap the data for a browser. Similarly, in order to access data stored in a VM file format, a specialized program would be required to convert the data to an HTML format.

One of the difficulties of maintaining and providing information on a global scale is that large organizations often have numerous disparate systems. Such disparate systems may utilize different types of hardware, operating systems, server applications, file structures, or file formats. Accordingly, every day processing tasks, such as searching for information, can become quite burdensome when disparate systems are utilized. Performing a simple search may require a user to manually log into multiple systems, issue multiple requests, and integrate multiple sets of results, all in different formats. In the two examples provided above, separate search commands would have to be issued to both the Lotus Domino Web interface and the VM server. U.S. Pat. No. 6,064,977 entitled, "WEB SERVER WITH INTEGRATED SCHEDULING AND CALENDARING," issued to Haverstock et al., and assigned to IBM Corporation, describes a system for accessing non-HTML objects in a web browser. Unfortunately, the patent, which is hereby incorporated by reference, fails to teach a system that facilitates searching among disparate systems.

Thus, heretofore, if an end-user wanted to search for information in two or more disparate systems, the user would have to issue two or more different search requests. In addition, the user would be responsible for integrating different sets of search results, which would generally be returned in different formats. Accordingly, a need exists to provide a system for allowing a single search criteria to be submitted to disparate systems, and then provide the results in a comprehensive format.

SUMMARY OF THE INVENTION

The present invention overcomes the above-mentioned problems by providing a system and method for searching for data in disparate systems and returning a comprehensive merged list of search results. In a first aspect, the invention provides a server system, comprising a processor and a memory, wherein the memory includes an operating system program and a search program executable by the processor, and wherein the search program comprises: (1) an interface for receiving a search request from a client; (2) a first module for issuing the search request to the operating system and receiving back a first list of search results; (3) a second module for issuing the search request to a disparate server system and for receiving back a second list of search results, wherein the second list of search results is in a disparate format than the first list; and (4) a merge system for merging the first list and the second list into a merged list having a common format.

In a second aspect, the invention provides a program product stored on a recordable medium that, when executed, comprises: (1) an interface for receiving a search request; (2) a mechanism for issuing the search request in a first request format to a first search system, and for receiving a first list of search results in a first format; (3) a mechanism for issuing the search request in a second request format to a second search system, and for receiving a second list of search results in a second format, wherein the first list is received in a disparate format than the second list; and (4) a mechanism for merging the first list and the second list into a common format.

In a third aspect, the invention provides a method of searching for data among disparate systems, comprising the steps of: submitting a search request to a search interface running on a host operating system; issuing the search request to a disparate server system; receiving a first list in format disparate from a host operating system file format; issuing the search request to the host operating system; receiving a second list in a format specific to the host operating system; and merging the first list and the second list into a merged list having a common format.

In a fourth aspect, the invention provides a server system, comprising a processor and a memory, wherein the memory includes an operating system program and a search program executable by the processor, and wherein the search program comprises: (1) an interface for receiving a search request from a client; (2) a module for issuing the search request to a first disparate server system and for receiving back a first list of search results; (3) a module for issuing the search request to a second disparate server system and for receiving back a second list of search results; and (4) a merge system for merging the first list and the second list into a merged list.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE DRAWINGS

Figure 1:
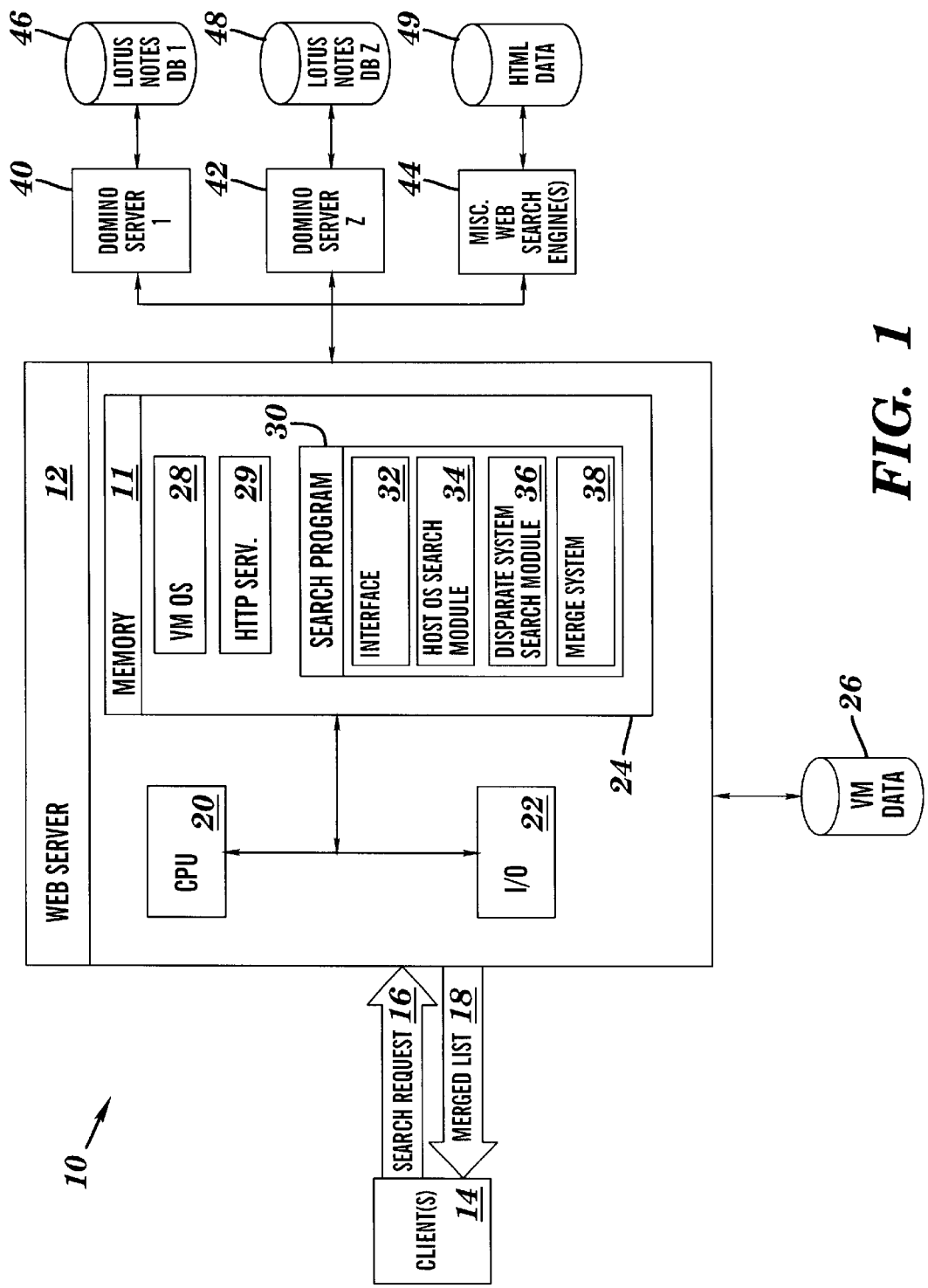
FIG. 1 depicts a searching system in accordance with a preferred embodiment of the invention.

Referring to FIG. 1, a search system 10 is depicted that allows a user at client 14 to submit a single search request 16 and receive a merged list 18 of search results from a plurality of disparate database systems. In this exemplary embodiment, client 14 comprises a web browser, and is connected to a web server 12 via a communications network with, e.g., a direct terminal, or via a remote workstation in a client-server environment. In the case of the latter, the client and server may be connected via the Internet, an intranet, a wide area network (WAN), a local area network (LAN), a private network, etc. The communications between client 14 and web server 12 are preferably done using a web-based HTTP protocol. Accordingly, merged list 18 is preferably returned to client 14 in an HTML format with links to data located by the search system 10.

Web server 12, which processes search request 16, includes a CPU 20, an input/output (I/O) 22, and memory 11. Memory 11 may comprise any known type of data storage and/or transmission media, including magnetic media, optical media, random access memory (RAM), read-only memory (ROM), a data cache, a data object, etc. Moreover, memory 11 may reside at a single physical location, comprising one or more types of data storage, or be distributed across a plurality of physical systems in various forms. CPU 20 may likewise comprise a single processing unit, or be distributed across one or more processing units in one or more locations. I/O 22 may comprise any system for exchanging information with external sources. In addition, although not shown, additional components, such as cache memory, communication systems, system software, etc., may be incorporated into web server 12.

In this exemplary embodiment, web server 12 is running IBM's VM operating system 28 as the host operating system, along with an HTTP server program 29 for handling web-based communications. Accessible to web server 12 is a host database, namely, VM database 26. VM database 26 includes VM data, which is stored in a VM file format and is accessible by VM operating system 28. It should be understood that while this exemplary embodiment describes a web server running VM as the host operating system, other host operating systems, such as UNIX, Windows NT, AIX, Linux, etc., could likewise be utilized. In the case where an alternate host operating system was used, the host database would contain data in the host operating system file format.

Also accessible by web server 12 are one or more disparate systems 40, 42 and 44 (or server applications) that control databases 46, 48 and 49 containing data in a file format that is disparate from VM data. In the exemplary embodiment depicted in FIG. 1, the disparate databases include a pair of Lotus Notes databases 46 and 48, and miscellaneous HTML data 49. The disparate databases 46, 48 and 49 are accessed by web server 12 via disparate systems 40, 42 and 44. Disparate systems 40, 42 and 44 differ from the VM operating system 28 since, among other reasons, they require different commands to access and search for data (i.e., the disparate systems speak a different language than host operating system). Thus, for example, disparate systems 40, 42 and 44 may operate by receiving a URL command and returning HTML data, as opposed to the VM operating system 28, which accesses data by receiving a VM operating system command, and returning data in a VM format.

In the exemplary embodiment, disparate systems comprise first and second Domino servers 40 and 42, as well as a miscellaneous web search engine 44. Domino servers 40 and 42 comprise well-known applications sold under the Lotus™ trade name that can, among other things, search Lotus Notes databases and return a list of search results in an HTML format. In general, Lotus Notes data is stored in a non-HTML format and is converted to an HTML format by the Domino servers 40 and 42. As noted above, Domino servers 40 and 42 are accessed via a URL command, which indicates the address of the particular server, and the instruction (e.g., search request) that is to be performed. Miscellaneous web search engine 44 may comprise any known type of search engine that can access HTML data (e.g., web pages) and return a list of search results. It should be understood that a disparate system may include any system that is capable of receiving a URL command and returning a response in an HTML format.

To effectuate the process of searching multiple databases with a single search request 16, web server 12 further comprises a search program 30 that can issue and process search information in both a host operating system format, and one or more disparate system formats. More particularly, search program 30 allows different databases to be searched with a single search request and for the results to be merged into a common format and returned back to browser 14 in a merged list 18. In general, search program 30 comprises an interface 32 for receiving search request 16 and displaying results; a disparate system search module 36 for issuing a search request to one or more disparate systems 40, 42 and 44 and processing the results; a host operating system search module 34 for issuing a search to the host operating system and processing results; and a merge system 38 for merging and sorting the results from the various searches.

Search program 30 may be implemented as a VM REXX CGI (common gateway interface), which is a well known programming format to one of ordinary skill in the art. For the purposes of the following example, it is presumed that the reader has such an understanding. Interface 28 is described in more detail below with respect to FIG. 3, but generally provides a means for inputting a search request from client 14, and outputting a list of search results for display to client 14. Each search result contains a URL link that allows a user to download and view the actual located item matched by the search request. In this exemplary embodiment, the search request can include up to five arguments or strings, which are logically "anded" together. Obviously, other more advanced search interface strategies (e.g., natural language, etc.) could likewise be implemented without departing from the scope of the invention. The search request is submitted as a URL containing the search arguments and is issued to web server 12. Once received, search program 30 is executed.

In this example, disparate system search module 36 issues a search to one or more Domino servers 40, 42 by issuing an HTTPGET command to the appropriate servers. The returned data (i.e., web page source HTML) is converted to look like other VM files and is saved in a REXX variable. More particularly, the HTTPGET command traps the returned HTML from the Domino database search, and a CGI program then strips unneeded HTML commands. The resulting records are formatted so that they look similar to other data (such as VM search results, etc.), which can be presented to the client's browser. An exemplary portion of CGI code that queries a Domino server is as follows:

```
...
domino3='http://w3.itso.ibm.com' /* w3 domino server for redpieces */
If st1=" Then search=st1
If st2=" Then search=search'+AND+'st2
If st3=" Then search=search'+AND+'st3
If st4=" Then search=search'+AND+'st4
If st5=" Then search=search'+AND+'st5
search=Space(search,0)
'CALLPIPE' ,
'CMS HTTPGET' domino3'/itsoapps/redbooks.nsf/RPSearch?OpenView&count
'| LOCATE ?<A HREF="/itsoapps/redbooks.nsf/?',
'| split before string /<A HREF="/',
'| LOCATE ?<A HREF="/itsoapps/redbooks.nsf/?',
'| CHANGE ?</FONT>? ?',
'| CHANGE ?</TD>? ? ',
'| CHANGE ?</TR>? ? ',
'| CHANGE ?</B>? ? ',
'| STEM redpiece.'
...
```

A sample HTML result returned to the REXX CGI from a Domino search request is as follows:

```
<HTML>
<!-- Lotus-Domino (Release 5.0.2a – November 23, 1999 on OS/2) -->
<HEAD>
<META NAME="robots" CONTENT="noindex">
</HEAD>
<BODY TEXT="000000" BGCOLOR="FFFFFF">
<DIV ALIGN=center>
<P><B><FONT SIZE=5 COLOR="000080">WebViews-Redpiece Search</FONT></B><
<FONT SIZE=2 COLOR="008080" FACE="Helvetica"> </FONT><BR>
<TABLE>
<TR><TD><A
HREF="/itsoapps/redbooks.nsf/8bf8f9a572a44be785256880005ba197/
<TR><TD><A
HREF="/itsoapps/redbooks.nsf/8bf8f9a572a44be785256880005ba197/
<TR><TD><A
HREF="/itsoapps/redbooks.nsf/8bf8f9a572a44be785256880005ba197/
...
```

Finally, a sample of the converted Domino output to be displayed is as follows:
...
SG241234 REDP 1.6 2000-01-10 BROWSE HREF="...
SG245678 REDP 1.4 1999-12-16 BROWSE HREF="...
...

After disparate system search module 36 completes its search tasks, a search may be initiated for host or VM data. Host operating search module 34 operates by searching objects, such as lists or files. A Rexx "PIPE" command is used to read and search the VM data. The located matches are then wrapped in the correct HTML format that can be sent to the client's browser. The following is a partial listing of exemplary VM catalog files that include file information along with an abstract (not shown).

SG242229 03 2000-02-22 IBM Magstar VTS: Implementation Guide (+Abstract . . . )

SG242230 01 1998-03-05 VisualAge 2000 Test Solution: Testing Year 2000 (+Abstract . . . )

SG242231 00 1998-05-27 Windows NT Backup and Recovery with ADSM (+Abstract . . . )

Search program 30 reads each of the VM files, keeping only those records matching the search request. The saved Domino output is then merged with the VM data.

An exemplary portion of a search CGI that searches VM data is as follows:

```
...
/* Fanin streams follow: */
/* SERV=1,BOOK=2,LIST=3,PDFS=4,INFO=5,REDP=6,PAPR=7,MATR=8 */
'CALLPIPE (endchar %)',
   'a: fanin  6 8 4 7 5  2 3',
   '| SORT 19.10 D',
   '| STEM input.',
```

-continued

```
'%',
'FILEFAST REDBOOKS CATALOG2' nfm ,
...
'%',
'FILEFAST REDPDFS CATALOG' nfm ,
'| SORT 14.10 D',
'| CASEI ALL ?'st1'? & ?'st2'? & ?'st3'? & ?'st4'? & ?'st5'?' ,
'| SPEC w1 next / PDFS / next w2-* next',
'| a:' ,
'%',
...
```

The same REXX CGI also merges the VM search results and the saved Domino search results. The REXX CGI then sorts the merged Domino and VM data records by date and the results are put in a STEM variable. The STEM variable data is then formatted with the required HTML commands and displayed on the client browser using the REXX "OUTPUT" command.

Exemplary code that displays the search results is as follows:

```
...
'OUTPUT' i'.'
'OUTPUT <font face="ARIAL, HELVETICA" size="1">'
'OUTPUT' '<strong>'
'OUTPUT' abstract
'OUTPUT' '</strong>'
'OUTPUT' ' '
'OUTPUT' ofn||ver new
'OUTPUT <br>'
'OUTPUT' date
...
```

Figure 2:
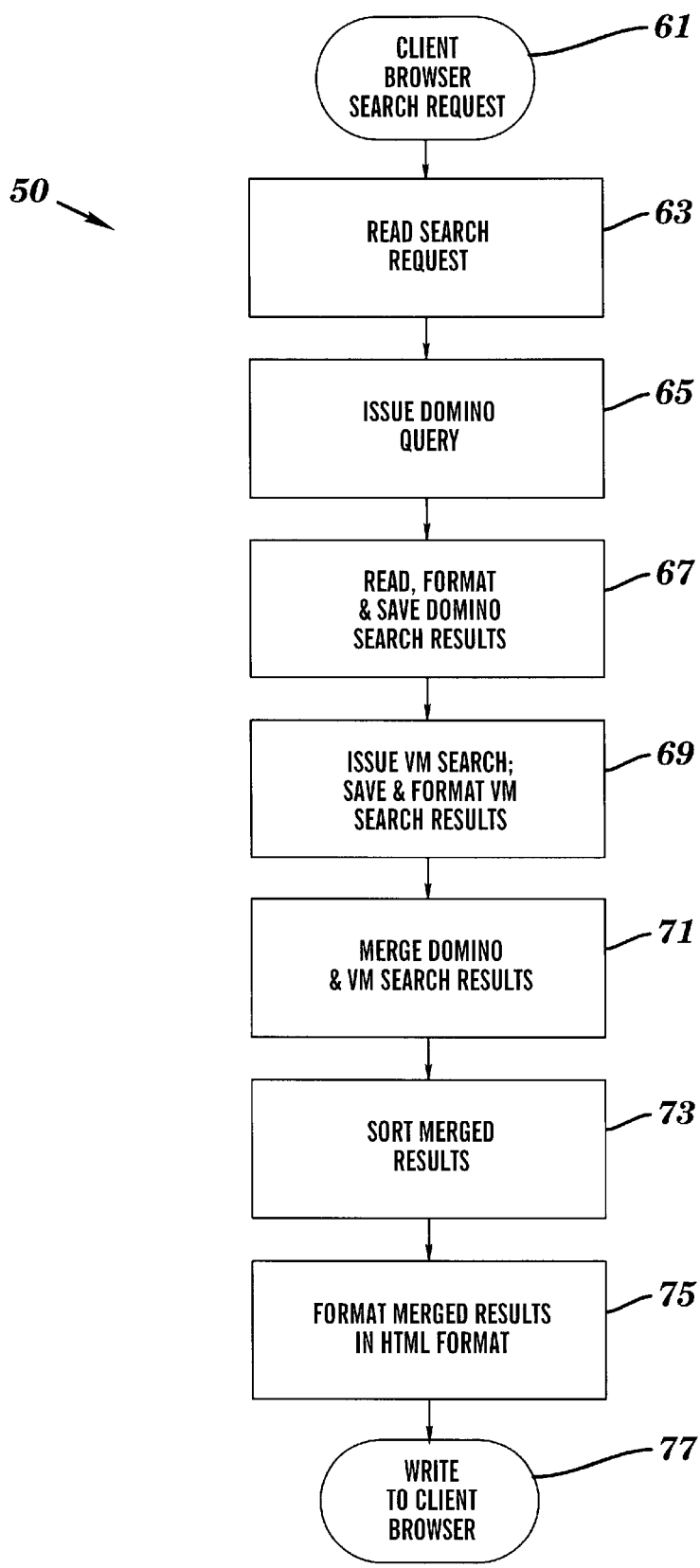
FIG. 2 depicts a flow diagram of a method of performing a search.

Referring now to FIG. 2, an overview of a method for implementing searches on disparate systems is depicted. First, a client browser submits a search request 61. Next, the search request is read 63 and a Domino query is issued 65. The Domino search results are then obtained, read, formatted and saved 67. Next, a VM search is issued and the VM search results are formatted and saved 69. The Domino search results and the VM search results are then merged together 71 and sorted 73. The merged results are then formatted into an HTML format 75, which is displayed back to the client browser 77. While this depicts one exemplary embodiment for implementing such a method, it should be understood that the order in which the search queries are issued can be changed without limiting the scope of the invention. Similarly, the order in which results are formatted, merged and sorted could likewise be altered without departing from the scope of the invention.

Figure 3:
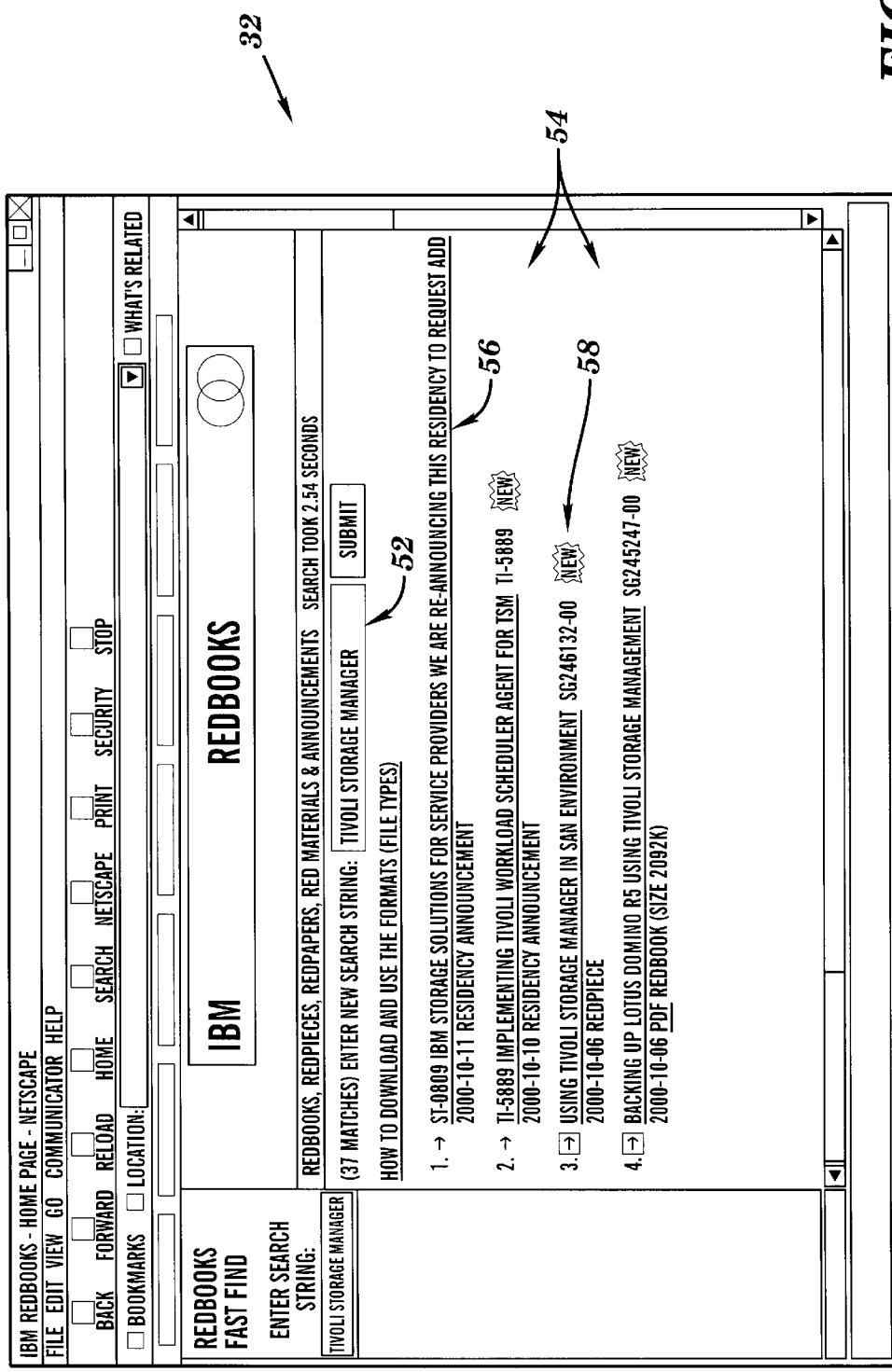
FIG. 3 depicts a browser interface for inputting a search request and receiving search results.

Referring now to FIG. 3, an exemplary interface 32 is depicted that includes a mechanism 52 for submitting a search request, and a merged list of search results 54. As can be seen, the interface comprises a standard web page format that includes hypertext links (the underlined material) to located files that met the search criteria in the various disparate systems. As can be seen, the respective formats of the results are virtually indistinguishable. In this case, the first result returned 56 was obtained from the VM database 26 ("Residency announcement"), while the third result 58 was obtained from a Lotus Notes database ("Redpiece"). The resulting merged list 54 allows a user to link to any of the disparate systems in which a search result was located.

It is understood that the present invention can be realized in hardware, software, or a combination of hardware and software. As indicated above, the components of search system 10 according to the present invention can be realized in a centralized fashion in a single computerized workstation, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, controls search program 30 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, module or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A server system, comprising:

a processor;

a local database having data stored in a host operating system format; and a memory, wherein the memory includes a host operating system and a search program executable by the processor, wherein the search program comprises:

an interface for receiving a search request from a client;

a first module for issuing the search request to the host operating system and receiving back a first list of search results from the local database in the host operating system format;

a second module for issuing the search request to a disparate server system and for receiving back a second list of search results, wherein the second list of search results is in a disparate format than the first list; and a merge system for merging the first list and the second list into a merged list having a common format.

2. The system of claim 1, wherein the common format comprises a hypertext markup language (HTML) format.

3. The system of claim 1, wherein the operating system includes a virtual memory (VM) operating system, and the first list of search results includes links to files in a VM file format.

4. The system of claim 1, wherein the second module issues a uniform resource locator (URL) command to the disparate server system, and wherein the second list of search results is returned in an hypertext markup language (HTML) format.

5. The system of claim 4, wherein the disparate server system serves files in a non-HTML format.

6. The system of claim 1, wherein the merge system further comprises a sorting system for sorting the merged list based on a predetermined criteria.

7. The system of claim 6, wherein the predetermined criteria includes a date.

8. The system of claim 1, wherein the search program includes a CGI script.

9. A program product stored on a recordable medium that, when executed, comprises:
   an interface for receiving a search request;
   a mechanism for issuing the search request in a first request format to a local host operating system and for receiving a first list of search results from a local database in a format specific to the host operating system;
   a mechanism for issuing the search request in a second request format to a second search system, and for receiving a second list of search results in a second format, wherein the first list is received in a disparate format than the second list; and
   a mechanism for merging the first list and the second list into a common format.

10. The program product of claim 9, wherein the first request format is disparate from the second request format.

11. The program product of claim 9, wherein the common format includes a hypertext markup language format.

12. The program product of claim 11, wherein the second list of search result is received in an hypertext markup language file format.

13. The program product of claim 9, wherein the first request format is readable by a virtual machine (VM) operating system.

14. A method of searching for data among systems including disparate systems, comprising the steps of:
   submitting a search request to a search interface running on a host operating system;
   issuing the search request to a disparate server system;
   receiving a first list in a format disparate from a host operating system file format;
   issuing the search request to the host operating system;
   searching a local host operating system database;
   receiving a second list in a format specific to the host operating system;
   converting the second list into a common format; and
   merging the first list and the second list into a merged list having the common format.

15. The method of claim 14, wherein the format of the first list of files includes a hypertext markup language format.

16. The method of claim 14, wherein the common format includes a hypertext markup language format.

17. The method of claim 14, comprising the further step of displaying the merged list.

18. A server system, comprising:
   a processor; and
   a memory, wherein the memory includes a host operating system and a search program executable by the processor, wherein the search program comprises:
      an interface for receiving a search request from a client;
      a first module for issuing the search request to a disparate server system that is disparate from the host operating system and for receiving back a first list of search results, wherein the disparate server system searches for data in a first non-HTML format and returns the first list of search results in an HTML format;
      a second module for issuing the search request to the host operating system and for receiving back a second list of search results, wherein the host operating system searches for host-operating system dependent data in a second non-HTML format, and wherein the second list of search results are converted by the second module into an HTML format; and
      a merge system for merging the first list and the second list into a merged list.

19. The server system of claim 18, wherein the second list of search results is in a disparate format than the first list.

20. The server system of claim 19, wherein the merged list is in a hypertext markup language format.

* * * * *